United States Patent [19]

Escaravage

[11] Patent Number: 4,702,494
[45] Date of Patent: Oct. 27, 1987

[54] DEVICE FOR ADJUSTING THE POSITION OF A STRAP RETURN ELEMENT OF A SAFETY BELT

[75] Inventor: Gerard Escaravage, Valentigney, France

[73] Assignee: Aciers et Outillage Peugeot, Audincourt, France

[21] Appl. No.: 924,468

[22] Filed: Oct. 29, 1986

[30] Foreign Application Priority Data

Oct. 30, 1985 [FR] France .................................. 8516139

[51] Int. Cl.$^4$ ...................... B60R 22/20; F16H 29/02
[52] U.S. Cl. ................................... 280/808; 74/89.22
[58] Field of Search ............................ 280/801, 808; 242/100.1; 74/89.22; 192/8 A, 8 C; 49/332, 352; 297/468, 483

[56] References Cited

U.S. PATENT DOCUMENTS 4,191,060  3/1980  Sessa ................... 74/89.22
4,529,159  7/1985  Terada et al. ................ 248/421

FOREIGN PATENT DOCUMENTS 0093024 11/1983  European Pat. Off. .
2720789 11/1978  Fed. Rep. of Germany .
3209351  9/1983  Fed. Rep. of Germany .
57-118950  7/1982  Japan .

Primary Examiner—John J. Love
Assistant Examiner—Karin L. Ferriter
Attorney, Agent, or Firm—Sughrue, Mion, Zinn, Macpeak & Seas

[57]  ABSTRACT

The device for adjusting the position of a strap return element (1) of a safety belt, in particular for a motor vehicle, in which the strap return element is mounted to be movable between two end positions in a guide rail (3), comprises actuating means (4) for driving in both directions of rotation a drum (6), around which there is wound a connecting element (7) whose two ends are connected to the vehicle, through coupling means (8) around which there is disposed the strap return element (1) so as to shift the latter to any point of an adjustment travel defined by said two end positions, and the coupling means comprising means (13) for preventing the rotation of the drum when a force is exerted on the strap return element.

8 Claims, 3 Drawing Figures

DEVICE FOR ADJUSTING THE POSITION OF A STRAP RETURN ELEMENT OF A SAFETY BELT

The present invention relates to a device for adjusting the position of a strap return element, in particular of a safety belt for a motor vehicle.

In most vehicles, this strap return element is disposed on an anchoring pin fixed to the body of the vehicle at a height suitable for the majority of users of a so-called normal size.

However, this height is not suitable for certain users, and in particular persons of small size.

In order to solve this problem, a number of devices are known in the art for adjusting the height of this strap return element.

Thus, for example, a device is known from the patent FR-No. 2 484 343 for adjusting the height of an anchoring point of a safety belt in which a slide moves along a screwthreaded support rod within the range of adjustment of the anchoring, this rod being rotatively mounted between the walls of a case fixed to an element of the body of the vehicle. The front side of this slide carries an anchoring member for the belt and its rear side carries an element for preventing rotation of the slide which guides it along the end wall of the case.

A device is also known from patent FR-No. 2 488 201 for adjusting the height of a return element of a safety belt of a vehicle comprising a regulating element carrying the return element, with a lock which engages in stop notches of a rectilinear guide, it being possible to disengage the lock by means of an actuating mechanism.

Patent FR-No. 2 482 539 also discloses a device for adjusting the anchoring point of a safety belt disposed above the shoulder of an occupant of the vehicle, in which the anchoring point is carried by a slideway slider which is movable in a slideway and held stationary by a pawl cooperating with a series of orifices provided in the slideway.

Patent FR-No. 2 513 887 discloses a device for adjusting the position in height of the upper element of the shoulder strap of a safety belt. This device comprises a slideway mounted on the body of a vehicle and provided with a guiding slot and cavities in which enters at least one locking element mounted on a slide which carries the element of the shoulder strap and can be locked and unlocked by means of a manual actuating element.

Patent FR-No. 2 543 838 discloses a anchoring device for the upper point of a safety belt, comprising a rail having a plurality of apertures which are in two parts, and a locking lug which can be shifted by an actuating knob. The adjustment of the position of the anchoring point is achieved by extracting the lug from the aperture, shifting the slide and re-introducing the lug into another aperture.

Patent FR-No. 2 536 288 discloses a device for adjusting in height a safety belt for a motor vehicle constituted by a guiding slideway having on two sides locking openings disposed one above the other, and a carriage which is movable in the slideway, this carriage carrying an element for fixing or returning the belt and including stop elements which may be shifted transversely relative to the direction of movement of the carriage by means of a button in opposition to the action of a spring for passing from a locking position to an unlocking position.

However, all these devices have a number of drawbacks, in particular as concerns the possibilities of adjustment, their relatively complex structure and, consequently, their relatively high manufacturing and mounting costs.

An object of the invention is therefore to solve the aforementioned problems by providing a device for rapidly and precisely adjusting the position of the strap return element so as to adapt the strap to the morphology of the user.

The invention therefore provides a device for adjusting the position of a strap return element of a safety belt, in particular for a motor vehicle, in which the strap return element is mounted to be movable between two end positions in a guide rail, said device comprising actuating means for driving in both directions of rotation a drum, around which is wound a connecting element whose two ends are connected to the vehicle, through coupling means around which is disposed said strap return element for shifting the latter to any point of an adjusting travel defined by said two end positions, and said coupling means comprising means for locking the rotation of the drum when an action is exerted on the strap return element.

A better understanding of the invention will be had from the following description which is given solely by way of example with reference to the accompanying drawings, in which.

Figure 1:
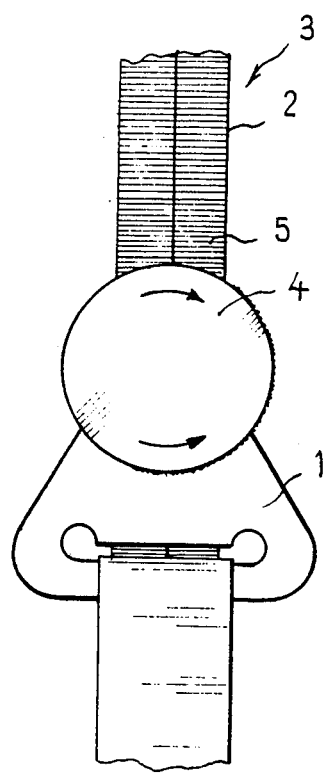
FIG. 1 is a front elevational view of an adjusting device according to the invention.

As can be seen in FIG. 1, a strap return element 1 is mounted to be movable along a slot 2 of a guide rail 3 between two end positions. This movement is achieved by an actuating element 4 which may be actuated for example manually so as to permit the raising or lowering of the strap return element 1 in said slot of the rail.

Note that the slot 2 of the rail may include deformable means 5 for closing the latter and preventing any entry of dust or foreign bodies into the mechanism of the device.

Figure 2:
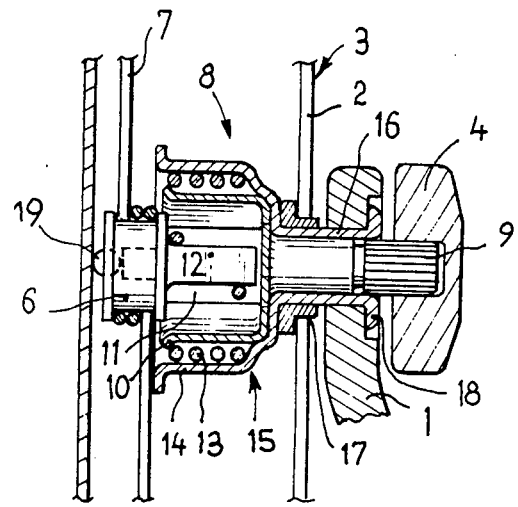
FIG. 2 is a longitudinal sectional view of the device shown in FIG. 1.

As shown in FIG. 2, the actuating element 4, constituted for example by a knurled knob, is adapted to drive in both directions of rotation a drum 6 around which there is wound a connecting element 7 whose two ends are connected to the vehicle. This driving is achieved through coupling means 8 around which the strap return element is disposed so as to shift this strap return element to any point of an adjusting travel defined by the two end positions.

The coupling means comprise a transmission spindle 9 which has one end portion projecting out of the guide rail 3 through the slot 2 formed in the latter, and is connected to the actuating element 4. The other end of this transmission spindle 9 is connected to a transmission member 10 which has a roughly circular cross-sectional shape and includes a notch 11 whose edges are adapted to cooperate with an eccentric projecting portion 12 of the drum 6 disposed between the edges of the notch so as to ensure the transmission to the drum of the rotation imparted to the actuating element 4.

Consequently, a rotation transmitted to the drum permits winding, for example the upper portion of the connecting element, and unwinding the lower portion thereof, so that the whole of the device, and therefore the strap return element, move upwardly.

These coupling means also include means for locking the rotation of the drum 6 when a force is exerted on the strap return element, for example in the event of a collision, etc. . . .

These locking means comprise a coil spring 13 which is mounted under stress in a first cylindrical portion 14 of a case 15 disposed around the transmission member 10, this case being prevented from rotating but being free to move in translation in the guide rail by any known means, for example by parts of the case which cooperate with lateral walls of the guide rail or with the slot of the latter.

This case also has a second cylindrical portion 16 disposed around the transmission spindle 9 and on which is rotatively mounted the strap return element 1.

Figure 3:
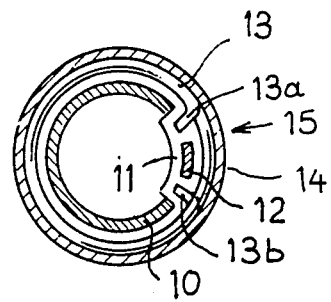
FIG. 3 is a cross-sectional view of the coupling means which are part of the construction of a device according to the invention.

As shown in FIG. 3, the coil spring 13 has at each of its ends a bent portion 13a and 13b disposed between an edge of the notch 11 of the connecting member 10 and the projecting portion 12 of the drum 6.

As will be understood hereinafter, the edges of the notch constitute elements for reducing the cross-sectional size of the spring around its axis, and the projecting portion of the drum constitutes an element for increasing the cross-sectional size of the spring and thereby urging it against the inner surface of the first cylindrical portion 14 of the case.

Returning now to FIG. 2, it will be clear that the strap return element 1 is held in position on the second portion 16 of the case by a spacer member 17, disposed on this first portion by the region of the slot 2 of the guide rail 3 and bearing against the second portion 16 of the case, and by a flange 18 provided at the corresponding end of the first portion 14 of the case.

Note that said spacer member 17 also constitutes first anti-friction means for limiting friction between the case and the guide rail.

Second anti-friction means, advantageously formed by a ball 19, are provided between the drum 6 and the corresponding wall of the guide rail 3.

Such a device operates in the following manner:

When a user wishes to shift the strap return element, he acts on the actuating element 4 by rotating it in either direction. This rotation is transmitted through the transmission shaft 9 to the transmission member 10 which exerts, through the edges of its notch 11, an action on one of the bent portions 13a or 13b of the spring, which causes the cross-sectional size of the spring to diminish around the axis. As the size of this spring 13 diminishes around its axis, the frictional forces therebetween and the first cylindrical portion of the case 15, which is prevented from rotation relative to the guide rail, become small enough to cause the transmitting member to rotate the spring, but also rotate the projecting portion 12 of the drum 6 and therefore the drum 6 itself. In this case, the connecting element 7, for example formed by a flexible cable, is wound around the drum and thus shifts the device, and consequently the strap return element, along the guide rail toward the desired position.

On the other hand, when a force is exerted on the strap return element, for example when a pull is exerted on the safety belt strap, it is the drum 6 which tends to rotate, through its projecting portion 12, the transmission member 10 and therefore the knurled knob so as to shift the strap return element in the same direction as the force exerted on the safety belt strap.

However, this projecting portion 12 of the drum 6 comes to bear against either one of the bent portions 13a, 13b of the spring 13 and exerts thereon a force which is proportional to the force exerted on the strap return element which tends to increase the cross-sectional size of the spring and therefore to urge the latter against the inner surface of the first cylindrical portion of the case, which is, as mentioned before, prevented from rotating relative to the guide rail. This firm application of the spring against the inner surface prevents the spring from rotating inside the cylindrical first portion of the case and thus immobilizes the projecting portion 12 of the drum 6, and consequently the drum, and thus prevents any displacement of the device and strap return element.

It will be understood that the actuating element 4 may be replaced by any other suitable device capable of rotating the transmission shaft 9 and therefore the drum 6.

What is claimed is:

1. A device for adjusting the position of a strap return element of a safety belt, in particular for a motor vehicle, said device comprising a guide rail, the strap return element being mounted to be movable between two end positions in the guide rail, a drum, a connecting element wound around the drum and having two ends for connection to the vehicle, actuating means, coupling means for connecting the actuating means to the drum, the strap return element being mounted on the coupling means, whereby the actuating means are capable of driving the drum selectively in either of two directions of rotation of the drum through the coupling means so as to shift the strap return element to any point of an adjusting travel defined by said two end positions, and means for preventing the rotation of the drum relative to the rail when a force is exerted on the strap return element.

2. A device according to claim 1, wherein the guide rail defines a slot and the coupling means comprise a transmission shaft having a first end portion which projects out of the slot of the guide rail and is connected to the actuating means and an opposite second end portion, a transmission member connected to the second end portion of the shaft and including a notch having opposed edges, the drum having a projecting portion disposed between the notch edges for cooperation with the notch edges so as to transmit to the drum rotation of the transmission member by the actuating means.

3. A device according to claim 2, comprising a case having a first cylindrical portion surrounding the transmission member and a second cylindrical portion surrounding the transmission shaft, the means for preventing rotation of the drum comprising a coil spring having a longitudinal axis and mounted in a stressed condition in the first cylindrical portion of the case, means for preventing rotation of the case relative to the guide rail, the strap return element being mounted on the second cylindrical portion of the case, the coil spring having at each end of the spring a bent portion disposed between a respective one of the edges of the notch of the connecting member and the projecting portion of the drum, the first cylindrical portion of the case having an inner surface, the edges of the notch constituting means for reducing the cross-sectional size of the spring about the longitudinal axis of the spring and the projecting portion constituting an element for increasing the cross-sectional size of the spring and causing it to bear firmly against the inner surface of the first cylindrical portion of the case.

4. A device according to claim 3, comprising a spacer member and a flange on an end of the first cylindrical portion of the case for maintaining the strap return element in position on the second portion of the case, the spacer member being disposed on the first cylindrical portion of the case and bearing against the second portion of the case and constituting first anti-friction means for limiting friction between the case and the guide rail.

5. A device according to claim 1, comprising second anti-friction means provided between the drum and a respective wall of the guide rail.

6. A device according to claim 5, wherein the second anti-friction means comprise a ball.

7. A device according to claim 1, wherein the connecting element is constituted by a flexible cable wound around the drum.

8. A device according to claim 1, wherein the actuating means is constituted by a knurled knob.

* * * * *